(12) United States Patent
Lehto

(10) Patent No.: US 9,676,043 B2
(45) Date of Patent: Jun. 13, 2017

(54) SLOT MILLING DISC AND A ROTATABLE MOUNTING SHAFT FOR SUCH A MILLING DISC

(71) Applicant: SANDVIK INTELLECTUAL PROPERTY AB, Sandviken (SE)

(72) Inventor: Ralf Lehto, Gavle (SE)

(73) Assignee: SANDVIK INTELLECTUAL PROPRTY AB, Sandviken (SE)

( * ) Notice: Subject to any disclaimer, the term of this patent is extended or adjusted under 35 U.S.C. 154(b) by 253 days.

(21) Appl. No.: 14/682,318

(22) Filed: Apr. 9, 2015

(65) Prior Publication Data
US 2015/0290726 A1 Oct. 15, 2015

(30) Foreign Application Priority Data

Apr. 11, 2014 (EP) ..................... 14164374

(51) Int. Cl.
*B23C 5/08* (2006.01)
*B23C 5/28* (2006.01)
*B23C 5/00* (2006.01)
*B23C 5/26* (2006.01)

(52) U.S. Cl.
CPC ............... *B23C 5/28* (2013.01); *B23C 5/006* (2013.01); *B23C 5/08* (2013.01); *B23C 5/26* (2013.01); *B23C 2210/161* (2013.01); *B23C 2250/12* (2013.01)

(58) Field of Classification Search
CPC ......... B23C 5/08; B23C 5/28; B23C 2250/12; B23B 29/043; B23D 59/02; B23D 59/025
See application file for complete search history.

(56) References Cited

U.S. PATENT DOCUMENTS

| 3,240,243 A * | 3/1966 | Golick | B23D 59/025 451/450 |
| 3,282,263 A * | 11/1966 | Christensen | B23D 59/025 125/15 |
| 4,333,371 A † | 6/1982 | Matsuda | |

(Continued)

FOREIGN PATENT DOCUMENTS

| DE | 10145006 A1 * | 4/2003 | ............... B23C 5/08 |
| EP | 1897642 A2 | 3/2008 | |

(Continued)

*Primary Examiner* — Will Fridie, Jr.
(74) *Attorney, Agent, or Firm* — Corinne R. Gorski

(57) ABSTRACT

A milling disc is formed as a generally circular disc having a center axis and including an outer peripheral surface provided with a number of cutting edges, a first side having a bearing surface around the center axis, and attachment means arranged to interact with mating attachment means of a rotatable mounting shaft to allow rotary preventing attachment of the milling disc to the rotatable shaft and forcing of the bearing surface towards a mounting surface at an end surface of the shaft. The milling disc is provided with at least one flushing fluid channel having a confined cross-section and extending within the milling disc from an inlet opening in its bearing surface to at least one outlet opening in its peripheral surface. There is also provided a rotatable mounting shaft for the rotatable attachment of such a milling disc.

17 Claims, 4 Drawing Sheets

(56) References Cited

U.S. PATENT DOCUMENTS

| | | | | |
|---|---|---|---|---|
| 4,516,560 A | * | 5/1985 | Cruickshank | B23D 61/025 125/15 |
| 4,870,946 A | * | 10/1989 | Long | B23D 59/025 125/13.01 |
| 5,040,341 A | * | 8/1991 | Okinaga | B23D 59/02 451/449 |
| 5,290,135 A | * | 3/1994 | Ball | B23F 21/22 407/11 |
| 5,340,248 A | | 8/1994 | Enbergs | |
| 5,423,717 A | * | 6/1995 | Boaz | B24D 5/10 451/449 |
| 5,846,125 A | * | 12/1998 | Robichon | B24D 7/10 125/11.22 |
| 2002/0009339 A1 | * | 1/2002 | Arvidsson | B23C 5/006 407/35 |
| 2006/0288992 A1 | * | 12/2006 | Baratta | B23D 61/026 125/13.01 |
| 2006/0288993 A1 | † | 12/2006 | Baratta | |
| 2012/0082519 A1 | † | 4/2012 | Hecht | |
| 2013/0236253 A1 | † | 9/2013 | Malka | |

FOREIGN PATENT DOCUMENTS

| | | | | |
|---|---|---|---|---|
| GB | 1060580 A | * | 3/1967 | B23D 59/025 |
| JP | 2006218549 A | | 8/2006 | |
| JP | 2008105115 A | | 5/2008 | |
| WO | 9409937 A1 | | 5/1994 | |

\* cited by examiner
† cited by third party

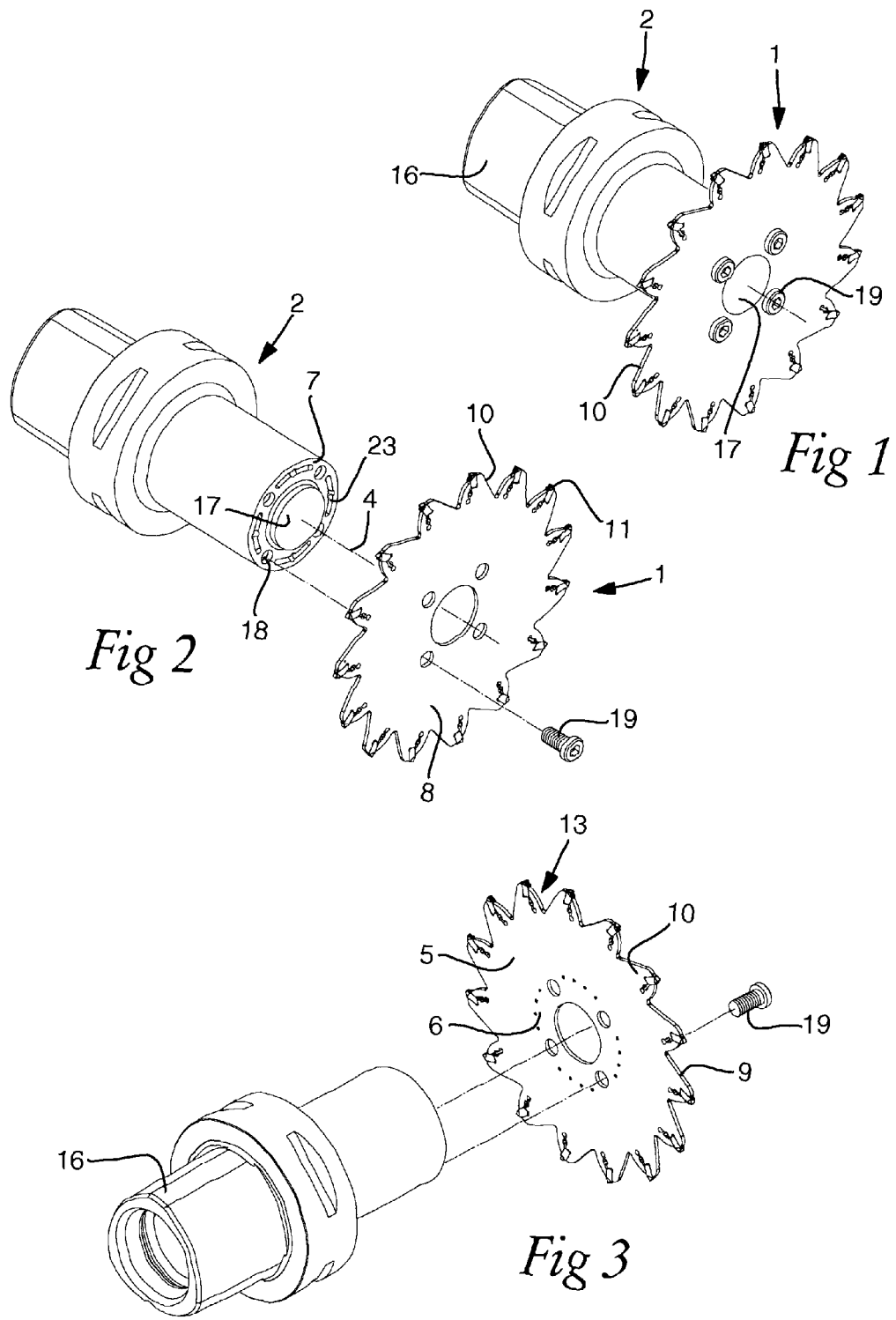

SLOT MILLING DISC AND A ROTATABLE MOUNTING SHAFT FOR SUCH A MILLING DISC

RELATED APPLICATION DATA

This application claims priority under 35 U.S.C. §119 to EP Patent Application No. 14164374.2, filed on Apr. 11, 2014, which the entirety thereof is incorporated herein by reference.

TECHNICAL FIELD

The present disclosure relates to a slot milling disc having a center axis, and including an outer peripheral surface provided with a number of cutting edges, a first side surface having a bearing surface around the center axis, a second side surface opposite the first side surface, and attachment means adapted to interact with mating attachment means of a rotatable shaft to allow rotary preventing attachment of the slot milling disc to the rotatable shaft and forcing of the bearing surface towards a mounting surface at an end surface of the shaft. The disclosure also relates to a rotatable mounting shaft for such a slot milling disc.

BACKGROUND

When machining a metal work piece by means of a rotating milling disc, it is often advantageous or even necessary to flush the work piece and/or the milling disc with a flushing fluid in the form of a gas, liquid or a mixture of gas and liquid. Such flushing can be performed for different reasons, e.g. for cooling or lubricating or for washing away cuttings or chips from the work piece during machining.

The most common way to achieve flushing of a slot milling disc is to simply direct a stream of liquid and/or gas from the outside towards the milling disc and the work piece at an area where the actual machining takes place. A disadvantage with such a flushing method is that the flushing will be very ineffective as most of the fluid will not reach the area where it could be of use. In case of a liquid flushing medium, this has the result that there will be formed a large amount of waste liquid, which has to be collected and filtered or disposed of.

EP 1897642 discloses a milling tool in form of a so called gear milling cutter, which is formed of two assembled disc parts. One of the disc parts is, in a surface to be facing and abutting the other disc part, formed with a circumferential channel and two radial feeding channels between a central hole and the circumferential channel. Moreover, small diameter holes are formed through the disc part between the circumferential channel and the periphery of the disc. By a gear milling cutter formed in this way it is possible to feed flushing fluid from a shaft, extending through the central hole, via the feeding channels, the circumferential channel and the small diameter holes to the cutting inserts at the periphery of the disc. However, such a milling disc will be rather expensive to manufacture due to its two-part form and it would not be possible to form a slot milling tool including a single disc in this way. Also, it is not in practice possible to manufacture a thin slot milling cutter having flushing fluid channels and a thickness of only about 2-10 mm in a two-part form. Moreover, arranging the fluid feeding to the disc from a central shaft to an inner edge surface of the disc is difficult to achieve without leakage and require some type of additional sealing since there always has to be a small but clear play between a mounting shaft and a mounting hole for tolerance reasons.

WO 94/09937 discloses in FIGS. 17 and 18 a rotary ring cutter, which is connected to a fluid flushing system to feed flushing fluid to the cutting edges of the rotary ring cutter. In this embodiment, the rotary ring cutter is mounted onto a head, which in its turn is mounted to a spindle. The flushing fluid is fed through axially directed pipes inside the spindle to an annual distribution chamber inside the head and through radially directed feeding pipes to curved grooves in the surface of the head facing the rotary ring cutter. By means of axially directed passages through the rotary ring cutter, the flushing fluid can be fed to the area of the cutting edges. However, a fluid flushing system according to this document could not be applied to a disc shaped slot milling cutter according to the present disclosure where the cutting edges are arranged along a periphery surface of the disc.

DE 10145006 discloses a slot milling disc having an integrated disc shaped portion and a hub formed portion, which is arranged at the center of the disc shaped portion and which is arranged to be connected to a rotatable shaft at a bearing surface having a recess or spline at the rear end of the hub portion. Around the periphery of the disc shaped portion there are a number of cutting inserts arranged, which are exchangeable by means of screws. In one embodiment the slot milling disc is formed with cooling medium channels extending in an axially direction from a bottom of a recess in the rear end of the hub portion. At a position where the axially cooling medium channels reach the same plane as the disc shaped portion, they change direction by turning ninety degrees and proceed to extend radially within the disc shaped portion and opens eventually into outlet openings in the outer periphery of the disc shaped portion. By a slot milling disc formed in this way, the cooling medium can be fed from the milling machine, through the hub portion, as well as the disc portion and be discharged from its periphery where the cutting and milling operation is performed. However, a slot milling disc designed in this way, having a disc portion and a hub portion, as well as internal cooling medium channels, will be complicated and hence expensive to manufacture. This design will further complicate matters when mounting the slot milling disc to the rotatable shaft of the milling machine, because it will require a sealing arrangement at the connection between the rotatable shaft of the milling machine and the bearing surface at the rear end of the hub portion.

As previously mentioned it is also known to form slot milling discs as thin discs, which do not include the above mentioned hub-portion, such having a thickness of only about 2-10 mm, which around their outer peripheries are provided with a number of cutting edges and which are primarily used for cutting grooves in various work pieces. On one side surfaces they have a bearing surface closest to their center axes, which is adapted to be facing and clamped towards a mounting surface in an end of a rotatable mounting shaft. Flushing of such milling discs with a flushing fluid for purpose of cooling, lubricating and/or flushing away chips, are thereby typically performed by means of one or more flushing fluid jets directed towards the milling disc and the work piece from the outside. However, such cooling, lubricating and/or flushing action arranged on the outside of the milling disc is ineffective, in particular in deep slotting, because the outside jet in general can't reach the relative deep parts of such slots during the slot milling operation.

SUMMARY

It is an aspect of the present disclosure to overcome at least the above mentioned disadvantages associated with prior art milling discs with flushing fluid channel(s) for distribution of flushing fluid to its peripheral surface. More precisely, it is an object to provide, in a simple and cost effective way, a slot milling disc which, free of leakage, allow distribution of flushing fluid from an inner portion of the slot milling disc to a peripheral surface of the same, and which independent of its diametrical size and thickness can be designed to fit one and the same rotatable shaft.

The disclosure also relates to a rotatable mounting shaft, having essentially the same object as above.

Accordingly, an aspect may be achieved by a slot milling disc, which is provided with at least one flushing fluid channel having a confined cross-section and extending within the milling disc from an inlet opening in the bearing surface, around a center axis on the first side surface, to an outlet opening in the peripheral surface. The inlet opening may form a blind hole in the plane bearing surface of the milling disc with the flushing fluid channel extending in a direction towards a peripheral surface of the milling disc, for example, in a straight radial direction or a straight and inclined radial direction, from the blind hole. Such relatively shallow blind holes may for instance be formed by a simple milling or drilling operation in the slot milling disc. With a slot milling disc designed in this way it is possible to mount the milling disc with its bearing surface on a first side of the disc clamped towards an end surface of a rotatable mounting shaft, wherein the end surface of the shaft is provided with at least one feeding opening being in fluid communication with a feeding channel intended for flushing fluid inside the shaft. By arranging the design and location of the one or more feeding openings in the end surface of the shaft and the one or more inlet openings in the bearing surface of the slot milling disc to each other, it is possible to mount milling discs of different sizes and different geometries to the one and same rotatable mounting shaft of a milling machine.

Also, by the slot milling disc designed in this way it is not necessary to arrange any additional sealing between the milling disc and the mounting shaft since when the bearing surface of the milling disc is forced towards the mounting surface of the shaft by the attachment means, a sufficient tightening/sealing effect being achieved solely between the bearing surface and the mounting surface. Moreover, the flushing fluid channels do not have to extend the entire distance between the periphery of the milling disc and its inner center axis or center hole, which is advantageous since it is expensive to make long channels within the relatively thin metal material of the slot milling disc. The bearing surface can be a plane surface, except for the inlet openings, on a first side surface of the milling disc and is extending perpendicular to the center axis.

In the two hereinafter described and illustrated embodiments of the invention, the slot milling discs or so called slot milling cutters are utilized to cut relatively deep and long slots or grooves, of a uniform width, in a work piece. The slot milling cutter may also be utilized for a cutting off or parting operation. The slot milling discs are in general flat with planar first and second side surfaces. However, it is to be understood that the invention could be realized also on slot milling discs not necessarily having entirely planar side surfaces.

Moreover, in the illustrated embodiments the cutting edges are arranged on separate cutting inserts and are oriented perpendicular to the rotary plane of the milling disc and have a width slightly larger than the width of the disc itself. However, the disclosure also relates to slot milling discs having cutting edges with a smaller width than the disc itself and/or being oriented at a different angle in relation to the rotary plane, and even slot milling discs having the cutting edges oriented substantially parallel to the rotary plane along each side surface of the milling disc. Instead of being formed in separate cutting inserts, the cutting edges could also be formed integrated with the disc and accordingly of the same material.

The attachment means for rotary preventing attachment of the slot milling disc to the rotatable shaft and pressing of the bearing surface towards an end surface of the shaft, are in the described and illustrated embodiments composed through holes in the disc and threaded holes in the end surface of the shaft, wherein screws are arranged to extend through the holes in the disc and be screwed into the threaded holes, as well as of a center hub to be extended through a center hole of the milling disc. It is to be understood, however, that the attachment means could be formed in many different ways and in fact every attachment means being capable of forcing the bearing surface of the milling disc towards the mounting surface at the end surface of the shaft and prevent rotation of the milling disc and the shaft in relation to each other, could be conceivable. Example of such attachment means could be a hub nut, guide pins in one of the shaft or the milling disc extending into holes in the other of these two, hydraulically, pneumatically or electrically operated attachment means and any combination of these.

In an embodiment, the slot milling disc is provided with at least one flushing fluid channel extending from an inlet opening in its bearing surface to an outlet opening in the peripheral surface between at least two consecutive cutting edges of the milling disc, and more precisely to an outlet opening situated in an area of a so called chip space in form of a concaveness in the peripheral surface between each cutting edge. The milling disc may hereby be provided with flushing fluid channels extending from inlet openings in the bearing surface to outlet openings in the peripheral surface between all of the cutting edges, and more precisely with at least one outlet opening being situated in each chip space. A chip space is adapted for accommodating a chip of cut material from the work piece during machining. By positioning each outlet opening in a chip space is this way the flushing fluid will assist in removing the cut chips from e.g. a slot being machined in a workpiece. The outlet opening may furthermore be positioned in the peripheral surface portion of the chips space being closest to the center axis of the milling disc. This reduces the length of the flushing fluid channel extending within the milling disc.

In one embodiment, the bearing surface extends maximum to half of the diameter from the center axis to the outermost periphery of the milling disc. In this way it's achieved that a considerable part of the disc diameter will be available for cutting slots in a work piece while still the area available for providing rigid attachment of the milling disc to the mounting shaft as well as fluid transfer from the shaft to the disc will be advantageously large. Moreover, the flushing fluid channels can be made advantageously short.

In another embodiment, the bearing surface extends maximum to one third of the diameter from the center axis to the outermost periphery of the milling disc. In this way it's achieved that a larger part of the disc will be available for cutting slots, i.e. it will be possible to cut deeper slots into the work peace with a disc having the same diameter.

In yet another embodiment, the bearing surface extends maximum to one fourth of the diameter from the center axis to the outermost periphery of the milling disc. In this way it's achieved that yet a larger part of the disc will be available for cutting slots, i.e. to cut deeper slots with a disc having the same diameter. Generally, the larger overall diameter of the milling disc, the smaller relative part of the disc has to be in form of a bearing surface in order to ensure sufficient attachment force and fluid transfer.

In one embodiment, the inlet openings comprise elongated, preferably arch-shaped, openings. An advantageous flow distribution can thereby be achieved between several flushing fluid channels having their inlet openings connected to a single (arch-shaped) opening. Hence, two or more flushing fluid channels may open into a common, elongated, arch shaped inlet.

Each elongate, arch shaped inlet opening may hereby have a center of curvature concentric with the center axis.

In one embodiment, the bearing surface is flush with the first side surface. The slot milling disc may hereby be easily manufactured by the bearing surface and first side surface forming a single plane surface. The first side surface and second side surface form plane parallel surfaces, wherein the bearing surface forms a portion of the first side surface.

In a further embodiment, the entire slot milling disc is made in one piece, e.g. of metal material, preferably with the exception of the cutting edges being provided by separate cutting inserts, e.g. of cemented carbide, being mounted in insert seats arranged at the peripheral surface of the milling disc.

The overall design of the milling arrangement, such as the number, the size and shape of the feeding openings of the shaft, the number, size and shape of the inlet openings in the bearing surface, the number, shape and orientation of the flushing fluid channels within the milling disc as well as the number, shape and location of the outlet openings in the peripheral surface of the milling disc, could be varied and modified in many different ways within the scope of the claims. Instead of feeding openings formed as elongated, arch shaped openings and the inlet openings as circular holes, as in the first embodiment, or both the feeding openings and the inlet openings formed as elongated, arch shaped openings, as in the second embodiment, it could also be conceivable to e.g. form the feeding openings as circular holes and the inlet openings as elongated, arch shaped openings.

It could also be possible to make the inlet openings and/or the feeding openings as a combination of circular or otherwise shaped holes and elongated, arch shaped openings, wherein two or more circular holes are interconnected by an elongated, arch shaped opening where the circular holes have a larger diameter than the width of the elongated, arch shaped opening. Moreover, instead of forming the inlet openings and/or the feeding openings as two or more elongated, arch shaped openings it could even be possible to arrange only one single, circular opening around the entire circumference of the disc and/or the shaft, if this could be carried out with respect to the attachment means, e.g. screws and the like, and with respect to the resulting weakening of the milling disc. If an inlet opening is formed in this way, all of the flushing fluid channels will open into one and the same inlet opening. On the other hand, if a feeding opening is formed in this way, it could be possible to connect the feeding opening to the fluid channel inside the mounting shaft by means of only one, single connecting channel.

Accordingly, the mounting surface of the shaft is provided with one or more enlarged feeding openings and/or the bearing surface of the disc is provided with one or more enlarged inlet openings, wherein the enlarged feeding openings and/or the enlarged inlet openings form predetermined connecting zones to which two or more flushing fluid channels may be connected. In this way a large variety of milling discs with respect to diameter size, number of cutting edges, number of flushing fluid channels and the like, can be adapted to fit such that their inlet openings automatically comes into fluid communication with a feeding opening when the bearing surface of the milling disc is mounted against the mounting surface of the shaft end by means of the attachment means.

Also, the outlet openings could be positioned closer to or even in close proximity of each cutting edge instead of in the chip space between each cutting edge as in the illustrated embodiments. It is even possible to let a flushing fluid channel branch off such that e.g. one channel portion leads to an outlet opening in close proximity of a cutting edge, whereas another channel portion leads to an outlet opening in the chip space. It is within the scope of the claims to arrange an arbitrary number of flushing fluid channels in the milling disc, accordingly also one single flushing fluid channel, which could be sufficient for certain applications. However, at least one flushing fluid channel is arranged to each chip space in order to ensure sufficient flushing, lubricating and/or cooling effect in the cutting zone.

The flushing fluid channels are extended within the milling disc, substantially in the rotary plane of the disc from an inlet opening in the bearing surface to an outlet opening in the peripheral surface of the disc. However, the flushing fluid channels need not be oriented strictly in the radial direction of the disc but can also be somewhat inclined in relation to the radial direction, as is illustrated in both of the embodiments.

The peripheral surface of the disc is the outer boundary of the disc. For a slot milling cutter the peripheral surface is normally perpendicular to the rotary plane but could also be formed as a bevelled or otherwise shaped surface.

The flushing fluid channels according to the embodiments are formed as confined bores having a circular cross section. The channels could be made by drilling. However, since the channels normally are rather long and have a small diameter, it is preferred to form the channels by means of spark-erosion sinking by which it is easier to make long and narrow holes. By spark-erosion sinking it is also possible to form the flushing fluid channels as confined bores having a cross section other than circular, for example as bores having a square or oval cross section.

A slot milling disc may normally have a diameter of between 60 to 315 mm and the bearing surface extends normally to maximum half, more preferably to maximum one third and most preferred to maximum one fourth of the distance from the center axis to the outermost portion of the peripheral surface. When the bearing surface of the milling disc is flush with its first side surface the outer limit of the bearing surface is normally not marked or visible since its extension in practice depends on the outer diameter of the mounting surface of the shaft. However, in any event the bearing surface extends at least a short distance beyond the inlet openings.

The thickness of the slot milling disc may be in the range of 1.5-10 mm, and preferably 2-8 mm. Hence, the milling disc is designed to cut relatively deep and narrow slots in the work piece. The inlet openings in the bearing surface are relatively shallow, and may extend into the milling disc in the range of 0.5-0.8 mm.

The flushing fluid may optionally be a liquid, e.g. water and/or oil, a gas, preferably compressed air but also other gases could be conceivable, or a mixture of gas and liquid, e.g. compressed air containing oil. One advantage with using a liquid fluid, and especially one comprising oil, is that the chips will be lubricated which will facilitate their removal from e.g. a slot in a work piece.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 1 is a perspective view, obliquely from the front and from above, of a milling disc, according to a first embodiment, mounted onto an end surface of a rotatable shaft.

FIG. 2 is an exploded perspective view according to FIG. 1 with the milling disc removed from the shaft.

FIG. 3 is an exploded perspective view of the embodiment according to FIG. 1, as seen obliquely from behind and above.

DETAILED DESCRIPTION

Figure 4:
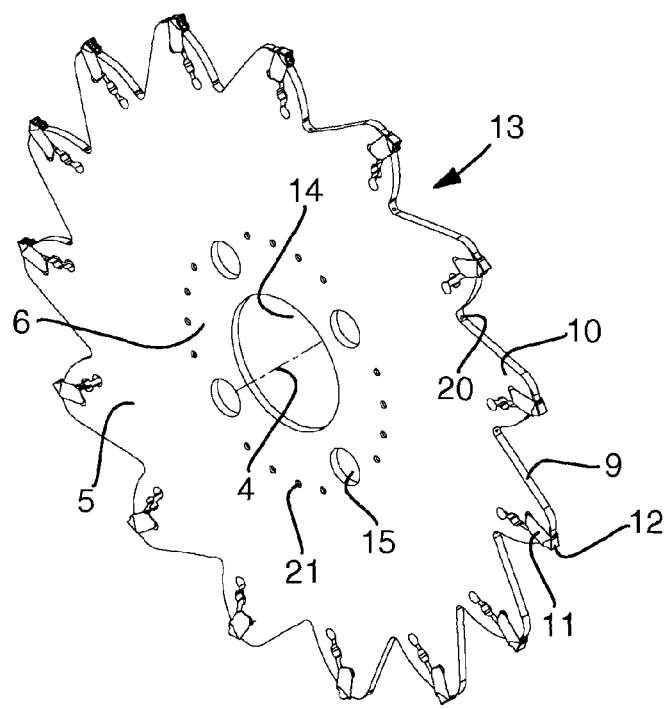
FIG. 4 is a perspective view of a first side of the milling disc according to the first embodiment.

A milling disc 1 according to the disclosure will hereinafter be described in two embodiments by reference to the drawings. In both of the embodiments, the milling disc is a slot milling cutter, which is used to cut slots or grooves of a uniform width in a work piece. Reference is first made to FIGS. 1-7, in which is illustrated a first embodiment of the milling disc 1 and a rotatable shaft 2.

FIG. 1 is a perspective view, obliquely from the front and from above, showing the milling disc mounted onto an end surface of the rotatable shaft. In FIG. 2 the milling disc and the rotatable shaft are shown from the same direction, but here the milling disc is removed from the rotatable shaft such that the end surface 3 of the shaft is visible. FIG. 3 corresponds to the view of FIG. 2, but the milling disc and the rotatable shaft are shown obliquely from behind and above.

The milling disc 1 includes a thin and flat disc body with a center axis 4 having a first side 5 with a bearing surface 6 arranged to bear against a mounting surface 7 on the end surface 3 of the shaft, and a second surface 8 arranged to face away from the shaft in the mounted state. The disc has an overall circular shape with a saw-tooth-like outer peripheral surface 9 having a number of saw-tooth-like projections 10. Each saw-tooth-like projection is, in the vicinity of its tip, provided with a recess in which is mounted a cutting insert 11 each having a cutting edge 12. The cutting inserts 11 in the illustrated embodiments are formed as parting and/or grooving inserts arranged to be used for cutting off or making grooves in a work piece, and are each provided with a comparatively long insert body having the cutting edge extending in its width direction.

The cutting insert 11 is mounted in a seat with a clamping finger for securing it in the seat of the slot milling disc. The cutting inserts have a width of 1.5-10 mm, preferably 2-8 mm, and are designed for cutting action in the feed direction. The cutting edge 12 of the insert 11 is however somewhat wider than the width of the slot milling disc in order to ensure clearance of the disc from the work piece in the slot during cutting.

The insert may be manufactured from cemented carbide, or other hard/wear resistant material, such as high speed steel or ceramics. Such cutting inserts are also known for parting and/or grooving within the art of turning. Between each two adjacent saw-tooth-like projections 10 is formed a concaveness, which is utilized as a chip space 13 in which cut chips are allowed to be formed/collected during cutting operation. The milling disc is also provided with a center hole 14 and attachment means in the form of four screw holes 15 distributed around the center hole.

The rotatable shaft 2 is in the form of an adapter, which is intended for being mounted to an undisclosed machine for rotating the slot milling disc. More precisely, on the end to be attached to the machine, the adapter is provided with a quick coupling, a so called cap-to-coupling, of a kind disclosed in U.S. Pat. No. 5,340,248, comprising a conical and hollow shaft 16 having a somewhat "triangular", non-circular cross section, which can be engaged by a not shown pull rod inside the shaft and drawn into a correspondingly shaped hole in the machine. On the other end, to which the slot milling disc is to be mounted, the shaft is cylindrical shaped and in the end surface 3 to be mounted towards the slot milling disc 1 it is provided with a projecting center hub 17 and a surrounding mounting surface 7 arranged to abut the bearing surface 6 of the disc.

The shaft also includes attachment means in the form of four screw holes 18 with internal threads for mounting screws 19. When mounting the milling disc 1 to the shaft 2 the disc is positioned against the end surface 3 of the shaft, such that the center hub 17 of the shaft is positioned within the center hole 14 of the disc and mounting screws 19 having screw heads are passed through the screw holes 15 of the disc and threaded into the screw holes 18 of shaft, as is illustrated in FIG. 1. By tightening the screws 19 the bearing surface 6 of the disc is forced into close contact against the mounting surface 7 of the shaft.

Figure 5:
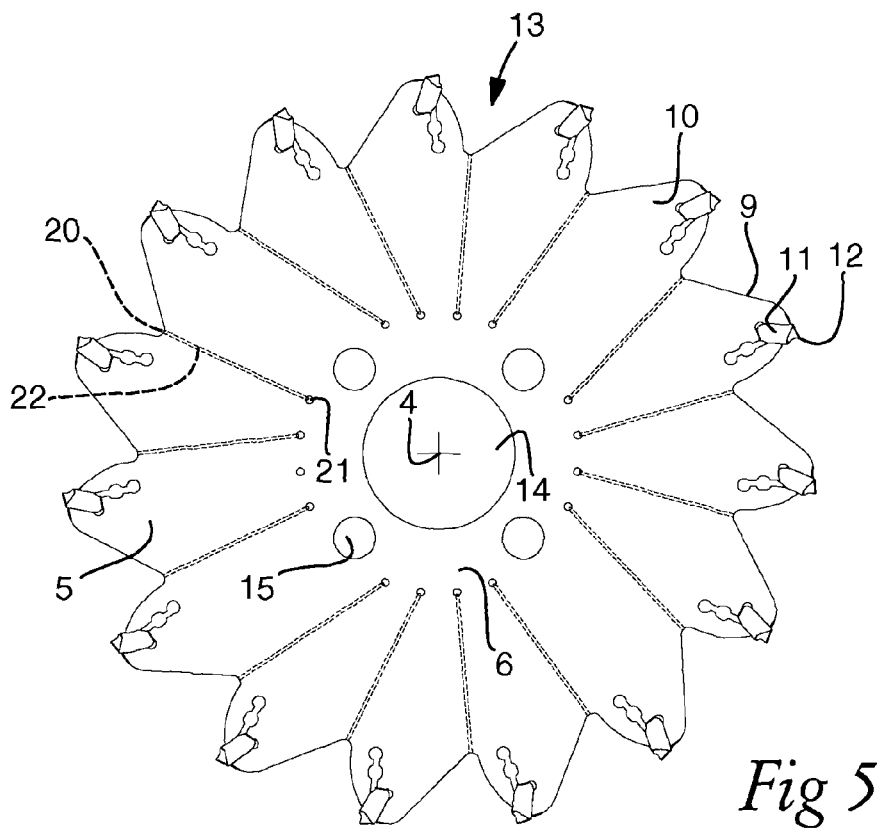
FIG. 5 is a side view of the first side of the milling disc according to the first embodiment in which the internal flushing fluid channels are indicated by dashed lines.

In order to allow efficient flushing with fluid, in form of liquid and/or gas, of the machined groove for washing away chips, cooling and/or lubrication during cutting operation, the disc is formed, as is best seen from FIGS. 4 and 5, with an outlet opening 20 in the peripheral surface 9 of the disc in each of the chip spaces 13, an inlet opening 21 for every outlet opening in the bearing surface 6 on the first side 5 of the disc, as well as an internal, confined flushing fluid channel 22 connecting each outlet opening 20 with an inlet opening 21.

Figure 6:
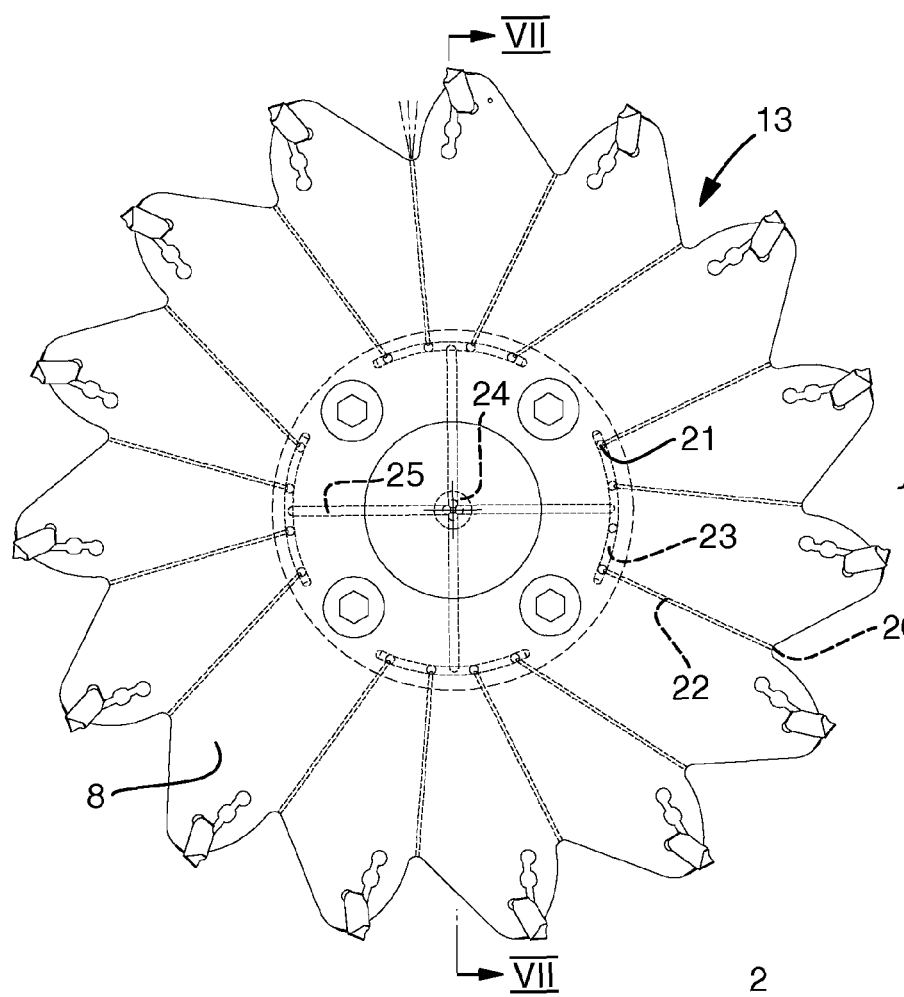
FIG. 6 is a side view of a second side of the milling disc according to the first embodiment being mounted onto a shaft, wherein the shaft and the fluid system in the disc and the shaft is indicated by dashed lines.
Figure 7:
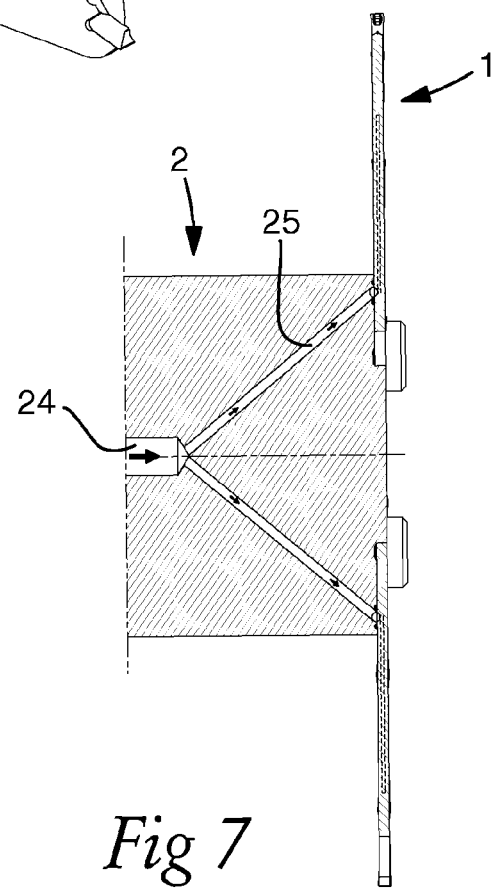
FIG. 7 is a cross-section along line VII-VII in FIG. 6.

Moreover, the mounting surface 7 of the shaft end 3 is, as is evident from FIGS. 2 and 6, provided with four elongated, arch-shaped or curved feeding openings 23 in the area between each two adjacent screw holes 18. Each curved feeding opening 23 is in fluid communication with a central fluid channel 24 within the shaft via a branching channel 25 for each feeding opening. This is illustrated in FIG. 6 by a view from the second side 8 of the disc through which the shaft and the entire distribution system for flushing fluid is indicated by dashed lines. As can be seen, flushing fluid can be distributed from the central fluid channel 24 and the four branching channels 25 within the shaft, to the curved feeding channels 23 in the mounting surface of the shaft end, and from there through the inlet openings 21 via the flushing fluid channels 22 within the disc to the outlet openings 20 in each chip space 13. As can be seen from FIG. 7, which is a longitudinal section through an end portion of the shaft 2 and the milling disc 1 along the line VII-VII in FIG. 6, the branching channels 25 extend obliquely from the central fluid channel 24 towards each feeding opening adjacent the outer periphery of the shaft end.

Figure 8:
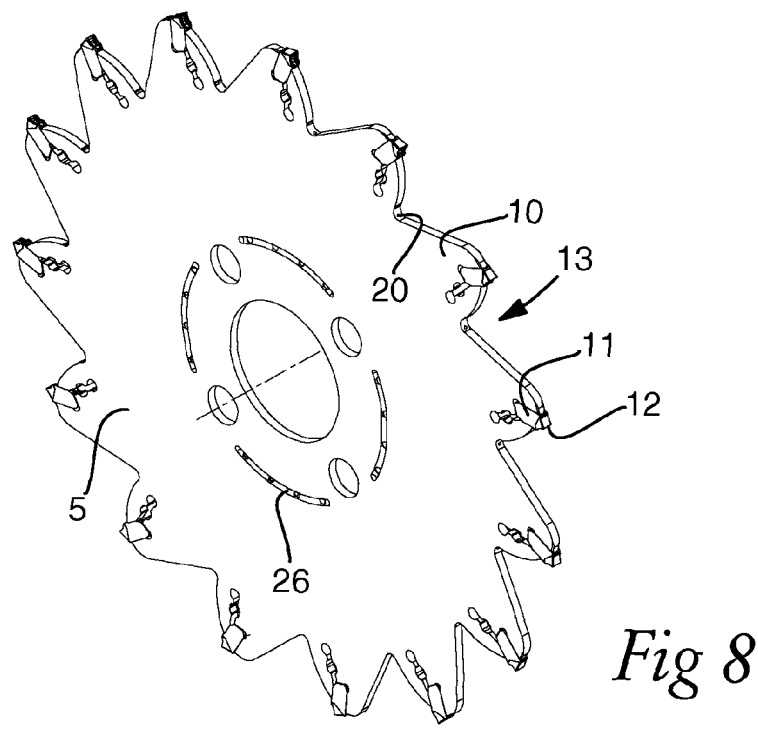
FIG. 8 is a perspective view of a first side of a milling disc according to a second embodiment.
Figure 9:
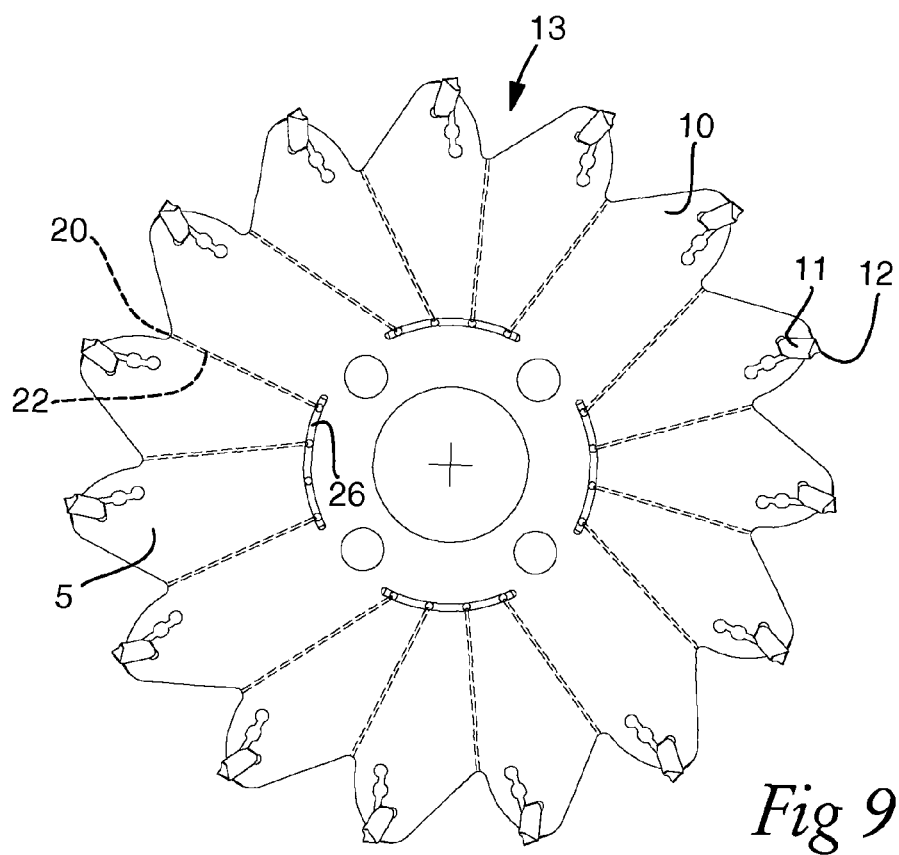
FIG. 9 is a side view of the first side of the milling disc according to FIG. 8 in which the internal flushing fluid channels are indicated by dashed lines.

A somewhat modified embodiment of the milling disc is illustrated in FIGS. 8 and 9 in a perspective view and a side view of the first side 5 of the disc. Here the inlet openings are not formed as circular holes for each flushing fluid channel 22 within the disc. Instead, the inlet openings are formed as four elongated, arch-shaped or curved openings 26 within the bearing surface 6 of the disc, which each corresponding in shape and position to the curved openings 23 in the mounting surface 7 of the shaft. Each flushing fluid channel 22 extends from the curved opening 26 being located closest to the respective outlet opening 20 in the chip spaces 13.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A slot milling disc having a center axis, and comprising:
   an outer peripheral surface provided with a number of cutting edges;
   a first side surface having a bearing surface around the center axis;
   a second side surface opposite the first side surface;
   attachment means arranged to interact with mating attachment means of a rotatable mounting shaft to allow rotary preventing attachment of the slot milling disc to the rotatable shaft and forcing of the bearing surface towards a mounting surface at an end surface of the shaft; and
   at least one flushing fluid channel having a confined cross-section and extending within the milling disc from an inlet opening in its bearing surface to at least one outlet opening in its peripheral surface.

2. The slot milling disc according to claim 1, wherein the at least one flushing fluid channel extends between at least two consecutive cutting edges.

3. The slot milling disc according to claim 1, wherein the bearing surface extends from a maximum to half of the diameter from the center axis to the outermost periphery of the slot milling disc.

4. The slot milling disc according to claim 1, wherein the bearing surface extends from a maximum to one third of the diameter from the center axis to the outermost periphery of the slot milling disc.

5. The slot milling disc according to claim 1, wherein the bearing surface extends from a maximum to one fourth of the diameter from the center axis to the outermost periphery of the slot milling disc.

6. The slot milling disc according to claim 1, wherein the inlet opening comprises at least one elongated opening.

7. The slot milling disc according to claim 6, wherein each elongated opening is arch-shaped.

8. The slot milling disc according to claim 7, wherein each elongated, arch-shaped inlet opening (26) has a center of curvature concentric with the center axis.

9. The slot milling disc according to claim 6, wherein two or more flushing fluid channels open into a common, elongated, inlet opening.

10. The slot milling disc according to claim 1, wherein the bearing surface is a plane surface on the first side surface of the slot milling disc and is extending perpendicular to the center axis.

11. The slot milling disc according to claim 1, wherein the bearing surface is flush with the first side surface.

12. The slot milling disc according to claim 11, wherein the first side surface and second side surface are plane parallel surfaces, and the bearing surface forms a portion of the first side surface.

13. The slot milling disc according to claim 1, wherein the entire milling disc is made in one piece, preferably with the exception of the cutting edges being provided by separate cutting inserts being mounted in insert seats arranged at the peripheral surface of the milling disc.

14. The slot milling disc according to claim 1, wherein the number of cutting edges is provided in separate cutting inserts being formed as parting and/or grooving inserts and being mounted in insert seats arranged at the peripheral surface of the milling disc.

15. A rotatable mounting shaft for rotatable attachment of a slot milling disc to a milling machine, the shaft being rotatable around a center axis, the slot milling disc including an outer peripheral surface provided with a number of cutting edges, a first side surface having a bearing surface around a center axis, a second side surface opposite the first side surface, and at least one flushing fluid channel having a confined cross-section and extending within the milling disc from an inlet opening in its bearing surface to at least one outlet opening in its peripheral surface, the mounting shaft comprising:
   attachment means, adapted to interact with mating attachment means of the milling disc and to force the bearing surface at the first side surface of the slot milling disc towards a mounting surface perpendicular to the center axis at an end surface of the shaft; and
   feeding openings in the mounting surface in fluid communication with the at least one fluid channel, the feeding openings being shaped and positioned to allow feeding of the at least one flushing fluid from the fluid channel to the inlet opening of the slot milling disc.

16. The slot milling disc according to claim 1, wherein the outlet opening is situated in an area of a chip space formed by a concaveness in the peripheral surface between each cutting edge.

17. The slot milling disc according to claim 16, wherein the outlet opening is positioned in the peripheral surface area of the chips space closest to the center axis of the milling disc.

* * * * *